United States Patent [19]
Ernst

[11] Patent Number: 4,547,772
[45] Date of Patent: Oct. 15, 1985

[54] MULTICOORDINATE SENSING HEAD

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 522,407

[22] Filed: Aug. 11, 1983

[30] Foreign Application Priority Data

Aug. 21, 1982 [DE] Fed. Rep. of Germany ....... 3231158

[51] Int. Cl.[4] ............................................. G08B 21/00
[52] U.S. Cl. ..................................... 340/686; 33/501; 200/61.42; 340/680
[58] Field of Search ............... 340/686, 680, 678, 540; 33/174 L; 200/61.42, 61.41; 307/119, 116; 29/119, 116

[56] References Cited

FOREIGN PATENT DOCUMENTS

| | | |
|---|---|---|
| 1028792 | 5/1959 | Fed. Rep. of Germany . |
| 1548326 | 7/1970 | Fed. Rep. of Germany . |
| 2242355 | 10/1974 | Fed. Rep. of Germany . |
| 2804398 | 12/1979 | Fed. Rep. of Germany . |
| 7900134 | 12/1979 | Fed. Rep. of Germany . |
| 1932010 | 6/1980 | Fed. Rep. of Germany . |
| 2712181 | 1/1981 | Fed. Rep. of Germany . |
| 1599758 | 2/1978 | United Kingdom . |

Primary Examiner—Glen R. Swann, III
Attorney, Agent, or Firm—Willian, Brinks, Olds, Hofer, Gilson & Lione, Ltd.

[57] ABSTRACT

A sensing pin is mounted to a housing by means of a linkage which makes it possible for the sensing pin to move entirely within the housing in the event of extreme deflection. In this way, extensive protection from damage is provided to the sensing pin in the event of excessive deflection.

17 Claims, 4 Drawing Figures

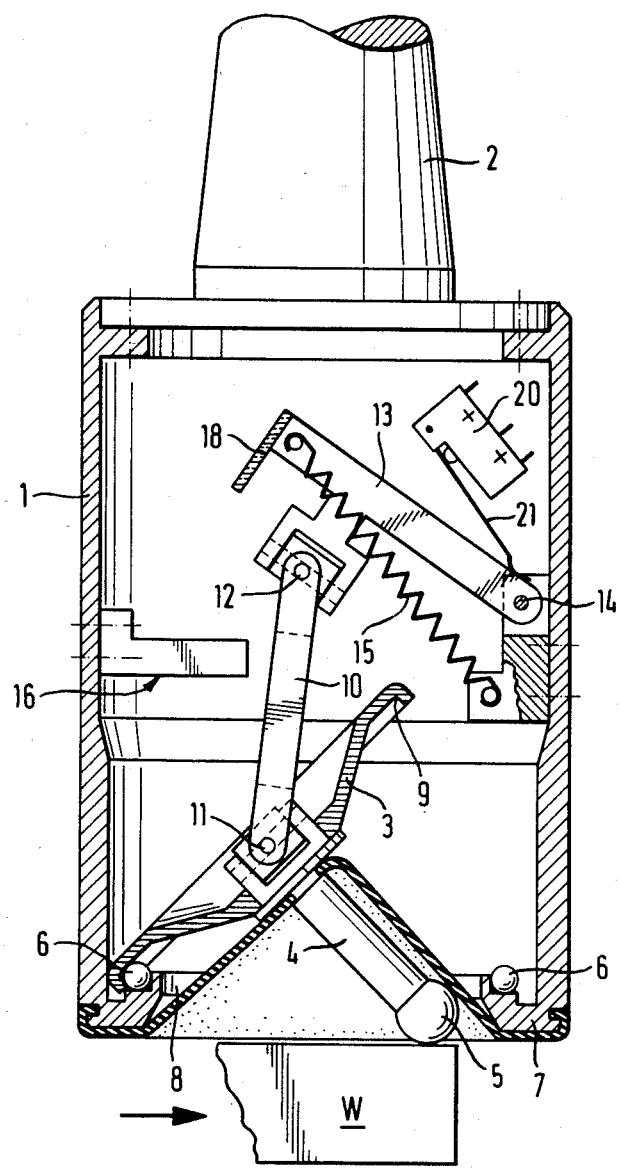

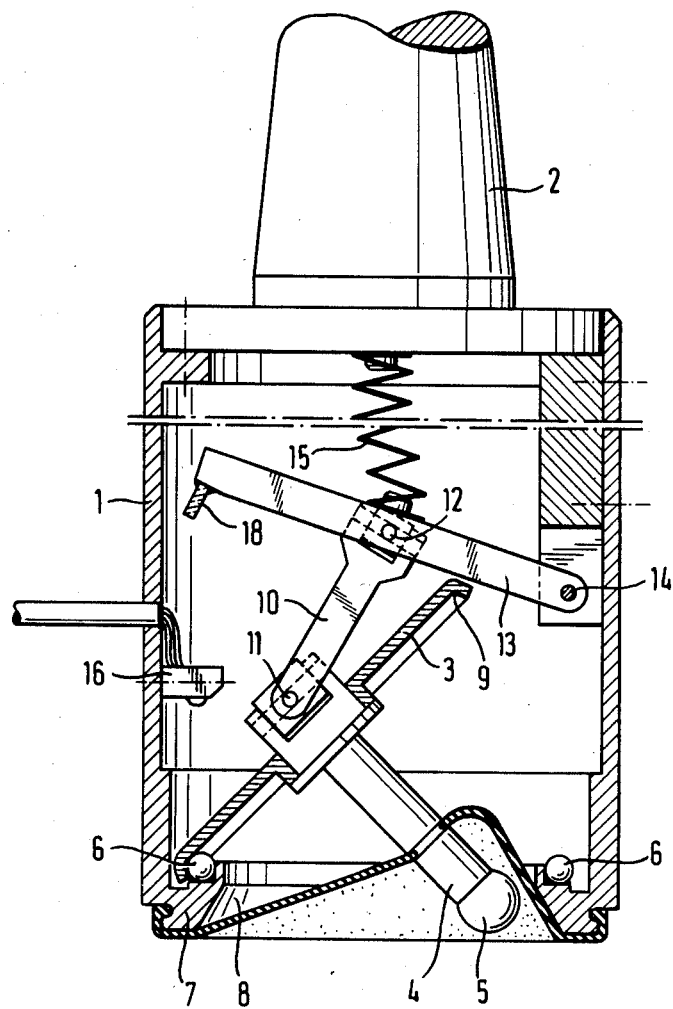

MULTICOORDINATE SENSING HEAD

BACKGROUND OF THE INVENTION

The present invention relates to an improvement in a multicoordinate sensing head of the type having a housing, a sensing pin, means for mounting the pin in the housing such that the pin is deflectable in a plurality of directions and is returned to a predetermined rest position following deflection, and means for generating a deflection signal in response to deflection of the pin.

A number of publications disclose a large diversity of multicoordinate sensing heads.

Thus, for example, German Patent DE-PS No. 22 42 355 discloses an electronic multicoordinate sensor, the sensing pin of which is mounted on a special straight guidance system. The disclosed multicoordinate sensor includes signal generators which operate to generate a deflection signal in response to the deflection of the sensing pin.

Furthermore, German DE-OS No. 15 48 326 shows a prior art zero sensing system adapted to be used on machine tools, in which an overload protection system is provided which in case of an overload allows a separation of the zero sensing system and the measuring device.

The foregoing examples of the prior art have been selected from a large number of relevant publications only by way of example. These prior art devices exhibit shortcomings when they are used not only in connection with measuring machines, but also to an increasing degree in connection with numerically controlled processing machines, such as processing centers. Workshop operation provides a harsh environment for multicoordinate sensors in contrast to the controlled environment of the measuring room. If efficiency and dependability of operation are to be maximized, largely automatic manufacturing machines will require measuring systems of a type different from known prior art approaches.

SUMMARY OF THE INVENTION

The present invention is therefore directed to an improved multicoordinate sensing head which to a large extent overcomes disadvantages of prior art devices and which is well suited for use in the harsh environment of workshops, in conjunction with both automatically controlled manufacturing machines and multicoordinate measuring machines. It is an object of this invention to provide a multicoordinate sensing head which generates a precisely reproduceable deflection signal in response to deflection of the sensing pin, which is sturdy and reliable, and which provides important safety advantages in order to prevent damage to the sensing head in the event of a measuring course error.

According to this invention, a multicoordinate sensing head of the type described initially above is provided with means for providing a cavity in the housing, which cavity is sized to receive the sensing pin. In addition, a linkage is provided in the mounting means for securing the pin to the casing such that the entire pin is movable into the cavity in response to extreme deflection of the pin in any direction of deflection. Further advantageous features of the invention are set forth in the dependent claims.

An important advantage of the sensing head of this invention is that extreme sensing pin deflection can be accommodated without damage to the sensing pin. Furthermore, excellent reproduceability of the sensing pin deflection signal is provided, and the sensing head of this invention can be built in a manner to provide low structural height and to utilize simple construction techniques.

The invention itself, together with further objects and attendant advantages, will best be understood by reference to the following detailed description, taken in conjunction with the accompanying drawings.

BRIEF DESCRIPTION OF THE DRAWINGS

FIG. 3 is a sectional representation of the sensing head of FIG. 1 in which the pin is deflected in a radial direction.

FIG. 4 is a sectional representation of a sensing head which incorporates a second preferred embodiment of this invention.

DETAILED DESCRIPTION OF THE PRESENTLY PREFERRED EMBODIMENTS

Figure 1:
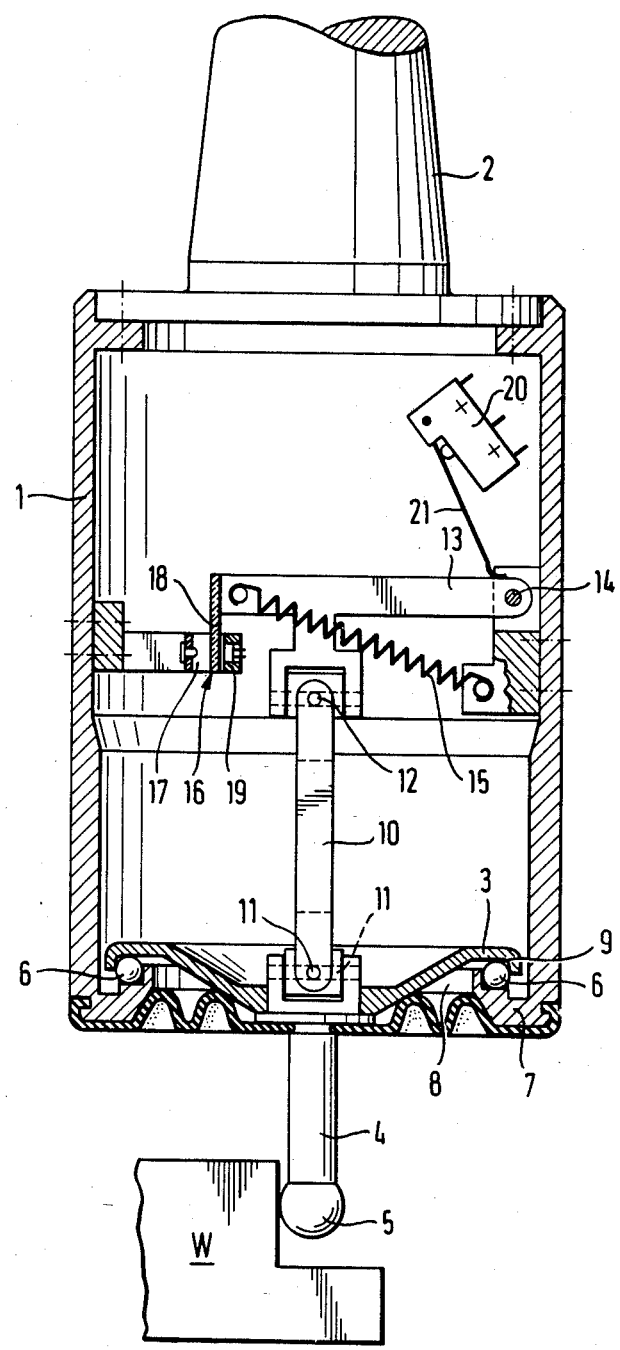
FIG. 1 is a sectional representation of a sensing head which incorporates a first preferred embodiment of this invention, in which the sensing pin is oriented in a rest position.

Turning now to the drawings, FIG. 1 illustrates a sensing head which incorporates a first preferred embodiment of this invention. In FIG. 1, the reference numeral 1 is used to designate a housing included in the sensing head. This housing 1 can be installed in the spindle of a measuring or processing machine (not shown) by means of a clamping pin 2 rigidly secured to the housing 1. If the machine is a numerically controlled processing center, then the sensing head can be stored in the tool magazine of the processing center and automatically taken out for measuring purposes and installed in the spindle of the processing machine. The sensing head of FIG. 1 includes a sensing pin 4 which is rigidly secured at its upper end to a substantially round plate 3 which is disposed within the interior of the housing 1. The free end of the sensing pin 4 carries a sensing ball 5. In FIG. 1, the pin 4 is shown positioned in a predetermined rest position which is defined by a ring of balls 6 which are cemented in place at a bottom surface 7 of the housing 1. These balls 6 are distributed symmetrically and uniformly around the circumference of a sensing pin opening 8, through which the sensing pin 4 extends. The ring of balls 6 forms a precise rest for the plate 3. In order precisely to define the rest position of the pin 4, the plate 3 defines rotationally symmetrical recess 9 which forms a flat and a curved (for example, conical) surface. In alternate embodiments the recess 9 can be defined by two conical surfaces. The recess 9 serves to receive the balls 6 in order precisely to center the pin 4 with respect to tilt angle and radial position. During initial manufacture of the sensing head of FIG. 1, the balls 6 are imbedded in a still soft cement and pressed into exact position with regard to height and radial position by the release 9. The balls 6 are then held in place until the cement hardens. In this way an extremely precise rest can be created for the plate 3 in an economical manner. By this means a high level of precision is obtainable which would be difficult to achieve by shaping the bottom 7 of the housing 1 with material-removing techniques.

A twisting safeguard (not shown in detail) ensures that the plate 3 and therefore the sensing pin 4 return to the predetermined starting position with regard to rotation after deflection. Furthermore, because of the exact positioning of the plate 3 with respect to the ring of balls 6, the zero position of the sensing ball 5 is always precisely the same within the allowed tolerances.

The sensing pin 4 is connected to the housing 1 by means of an articulated linkage. In this linkage, the sensing pin 4 acts as an input linkage member, which is joined with an intermediate linkage member 10 by means of a spatial joint 11, such as a cardan or universal joint. The upper end of the intermediate linkage member 10 is connected to another spatial joint 12, which is in turn secured to a pivot lever 13. The pivot lever 13 forms an output linkage member of the articulated linkage and is articulated by means of a pivot joint 14 on the interior of the housing 1. As used herein, the term "pivot joint" is used in its broad sense to signify a joint which allows pivotal motion in a predetermined plane while restraining movement outside of that plane. As used herein, the term "spatial joint" is used to signify a joint which allows free pivotal motion in three dimensions in the manner of a ball joint or a universal joint.

A spring 15 is mounted between the housing 1 and the pivot lever 13. This spring 15 provides a downwardly acting biasing force on the plate 3 in order to bias the sensing pin 4 into its zero or rest position. The pin 4 is deflectable in any direction way from its rest position against the biasing force provided by the spring 15.

A photoelectric position measuring system 16 responds to movement of the free end of the pivot lever 13 to generate a sensing pin deflection signal when the sensing pin 4 has been deflected in any direction away from its rest position. As shown in FIG. 1, the position measuring system 16 includes a light source 17, such as a light-emitting diode, and a photosensor 19. This photosensor can, for example, be a differential photosensor which is effective to generate a deflection signal in response to the difference in illumination between two portions of the photosensor 19. In this event, an optical element 18 such as a lens is arranged such that the differential photosensor 19 receives a balanced illumination from the light source 17 at the rest position. This symmetry of illumination is disrupted when the sensing pin 4 is moved, thereby causing generation of the deflection signal. In alternate embodiments, the optical element 18 can include a scanning plate which defines a reference mark, the position of which is used as an index of the position of the sensing pin 4.

Ordinarily, the working range of such a sensing head is in the range of 1 to 2 millimeters. Typically, the generation of the sensing pin deflection signal occurs after a deflection of no more than 10 microns in order to ensure the required reproduceability of the measurements.

In general, sensing pin deflection is brought about by moving a workpiece W into contact with the sensing pin 4. The sensing pin deflection signal then serves to fix the measuring value in effect at the moment of contact between the sensing pin 4 and the workpiece W. The sensing pin deflection signal can be used in order to stop the components of the machine which are movable relative to one another under numerical control. It is evident that the above-described working range of only a few millimeters makes it problematical as to whether or not the machine components will be stopped reliably within the working range of the sensor head. For this reason, a number of prior art sensing heads provide a predetermined overstroke of about 5 millimeters so that in this overstroke deflection range the sensing pin 4 is not damaged. In the event of problems in the control or drive systems of the processing machine, this overstroke in some cases may not suffice to protect the sensing head from damage. For this reason, there are also overload safeguards which unlatch the sensing head when the deflection of the sensing head pin becomes too great. As mentioned in the opening paragraphs of this specification, such known solutions to the problem have disadvantages.

Figure 2:
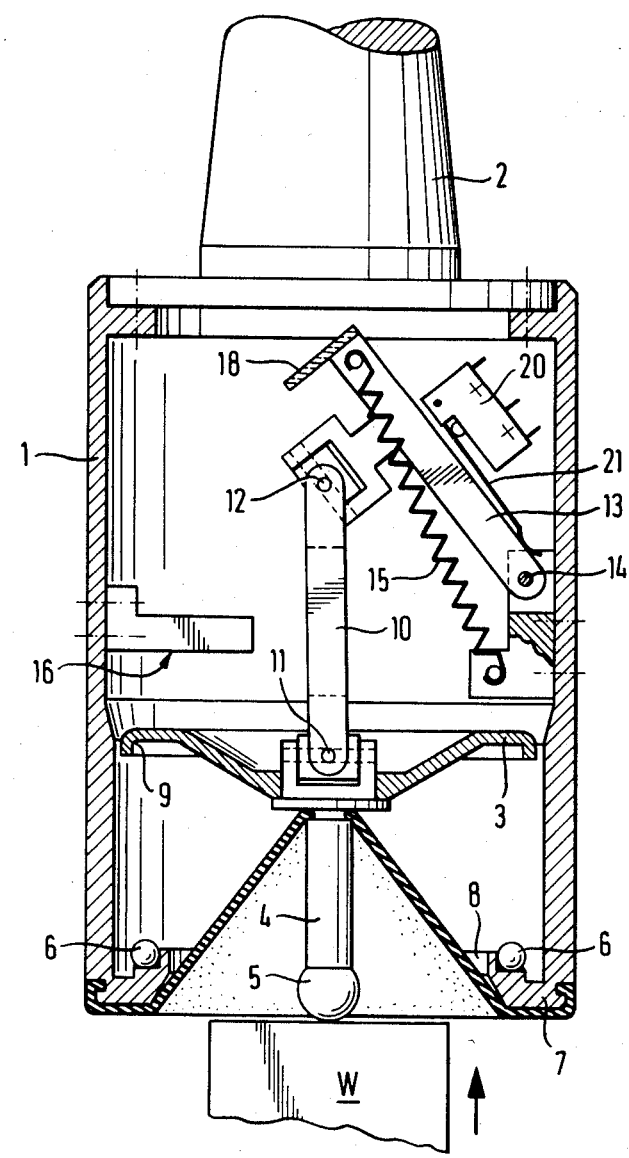
FIG. 2 is a sectional representation of the sensing head of FIG. 1 in which the sensing pin is deflected in an axial direction.

The suspension system shown in FIG. 1 for the sensing pin 4 provides an improvement over prior art approaches in the case of improper deflection of the sensing pin 4. This sensing pin 4 can be moved entirely within a cavity defined by the sensing head housing 1, as is evident from FIGS. 2, 3 and 4. As shown particularly in FIGS. 2 and 3, the particular direction the workpiece W contacts the sensing pin 4 is a matter of no importance. In any direction of movement, the linkage and the sensing pin 4 move out of the rest position in correspondence to the sensing movement and the pivot lever 13 is pivoted in a plane about the axis of the pivot joint 14. The intermediate linkage member 10 in the process occupies a position which is determined by the deflection of the sensing pin 4 and the pivoting of the pivot lever 13. The restoring force of the spring 15 provides a biasing force to counteract such deflection.

The position measuring system 16 causes the generation of a deflection signal as soon as the pivot lever 13 moves slightly out of its rest position (as shown in FIG. 1). Such slight movement of the pivot lever 4 is brought about by the slightest contact between the workpiece W and the sensing pin 4. In radial deflections of the sensing pin 4, the pin 4 pivots about an axis defined by at least one of the balls 6, as is shown in FIG. 3.

Since a deflection out of the working zone (for example a deflection of the sensing ball 5 by more than 5 millimeters) always indicates an error condition there can advantageously be provided an alarm device 20. This alarm device 20 may include for example a microswitch 20 having a long triggering lever 21 which engages the pivot lever 13 and which triggers the microswitch 20 as soon as a preselected angular position of the lever 13 is reached. Further deflection of the pivot lever 13 beyond this predetermined position is without significance with regard to the switching behavior of the microswitch 20. The alarm signal generated by the alarm device 20 can be used to initiate an optical and/or acoustic alarm signal to alert operators to an error condition, or it can be used to bring about an immediate "emergency off" shutdown of the machine. Manual intervention into the run-off of the workpiece being processed is required in any event after such an error condition.

This manual intervention after extreme deflection of the sensing pin 4 allows also a further development of the sensing head of this invention, as shown in FIG. 4. When after a malfunction a manual intervention (into an otherwise automatic run-off) is necessary, the sensing head can be constructed in such a way that the sensing pin 4 is automatically pulled or snapped into the interior of the housing 1 in the event of deflection of the sensing pin 4 beyond its working zone. The linkage 4, 10, 11, 12, 13, 14 and the spring 15 can be arranged in such a way that after the sensing pin 4 is pulled into the interior of the housing 1, the sensing pin 4 is arrested in place in the interior of the housing 1 and thereby protected from damage. In the embodiment shown in FIG. 4, this automatic snapping of the sensing pin 4 into the housing 1 and the arresting of the sensing pin 4 in place is brought about by the force components of the spring 15. As shown in FIG. 4, the intermediate link 10 reaches an overcenter condition in which the biasing forces developed by the spring 15 act to pull the pin 4 upwardly into the housing 1 and to hold it in place once an extreme angle of deflection is reached. In alternate embodiments, mechanical or electromechanical systems may be provided in the housing 1 to arrest the pin 4 in place within the housing. For example, a driveable locking lever can be used for this purpose. In operation of the embodiment of FIG. 4, the sensing pin is manually returned to the rest position of FIG. 1 at the point of manual intervention after the alarm signal has been generated.

This second preferred embodiment also provides advantages in the transport and storage of the sensing head. Whenever it is desired to protect the sensing pin 4 from damage, the sensing pin 4 can be pushed into the interior of the housing 1 and held in place automatically by the mechanism described above. The sensing pin opening 8 can then be closed, as for example with a cap.

Of course, it should be understood that a wide range of changes and modifications to the preferred embodiments described above will be apparent to those skilled in the art. For example, it lies within the scope of this invention to provide an alternate mounting arrangement between the sensing pin 4 and the housing 1 to define the rest position of the pin 4. Similarly, details of the linkage used to permit movement of the sensing pin 4 into the housing can be modified as desired. The position measuring system for generating the measuring pin deflecting signal can likewise be modified to operate inductively, capacitively or magnetically. It is therefore intended that the foregoing detailed description be regarded as illustrative rather than limiting, and that it be understood that it is the following claims, including all equivalents, which are intended to define the scope of this invention.

I claim:

1. In a multicoordinate sensing head comprising a housing, a sensing pin, means for mounting the pin in the housing such that the pin is deflectable in a plurality of directions and is returned to a predetermined rest position following deflection, and means for generating a deflection signal in response to deflection of the pin, the improvement comprising:
    means for defining a cavity in the housing, said cavity sized to receive the pin; and
    a linkage, included in the mounting means, for securing the pin to the housing such that the entire pin is movable into the cavity in response to extreme deflection of the pin in any direction of deflection.

2. The invention of claim 1 wherein the linkage comprises:
    at least two links;
    at least one pivot joint coupled to one of the links; and
    at least two spatial joints coupled to at least one of the links.

3. The invention of claim 1 wherein the linkage comprises:
    an output link coupled to the housing;
    an intermediate link;
    an input link;
    a first cardan joint interconnecting the output and intermediate links; and
    a second cardan joint interconnecting the intermediate and the input links.

4. The invention of claim 3 wherein the output link comprises a lever pivotably mounted to the housing and the input link comprises the sensing pin.

5. The invention of claim 1 wherein the mounting means further comprises means for automatically moving the sensing pin into the cavity in response to deflection of the sensing pin beyond a selected working zone.

6. The invention of claim 1 wherein the mounting means further comprises means for automatically arresting the sensing pin within the cavity in the housing.

7. The invention of claim 1 wherein the mounting means further comprises:
    a substantially round plate defined by the sensing pin within the cavity; and
    a ring of balls secured to the housing to support the plate;
    said plate and ring of balls cooperating to define the predetermined rest position.

8. The invention of claim 7 wherein the plate defines a rotationally symmetrical recess positioned to receive the balls and shaped to center the plate with respect to the ring of balls by means of at least one curved surface, and wherein the balls are cemented in place to the housing.

9. The invention of claim 1 wherein the deflection signal generating means is responsive to movement of a pivot lever included in the linkage.

10. The invention of claim 1 wherein the deflection signal generating means comprises a photoelectric position measuring system.

11. The invention of claim 10 wherein the measuring system comprises:
    a light source;
    a photosensor; and
    an optical element positioned to modulate light from the light source received by the photosensor.

12. The invention of claim 11 wherein the light source comprises a light emitting diode, wherein the photosensor comprises a differential photo element, and wherein the optical element comprises a lens.

13. The invention of claim 11 wherein the optical element comprises a scanning plate which defines a reference mark.

14. The invention of claim 1 further comprising means for generating an alarm signal in response to excessive deflection of the sensing pin beyond a working zone.

15. In a multicoordinate sensing head comprising a housing and a sensing pin, the improvement comprising:
    means for defining a cavity in the housing, which cavity defines a sensing pin opening;
    a ring of balls cemented to the housing in a symmetrical array around the opening;
    a circular plate mounted to the pin within the cavity, said plate defining a circular recess sized to receive the balls such that the recess and the balls cooperate to position the pin in a predetermined rest position;
    an intermediate link which defines first and second ends;
    a first universal joint which interconnects a central portion of the plate with the first end of the intermediate link;
    an output link which defines third and fourth ends;

a second universal joint which interconnects the second end of the intermediate link with the third end of the output link;

a pivot joint which interconnects the fourth end of the output link with the housing such that the output link is constrained to pivotal movement in a plane;

means for biasing the pin into the rest position; and means for measuring the position of the output link;

said links and joints cooperating to allow the pin to move entirely within the cavity in response to excessive deflection of the pin.

16. The invention of claim 15 further comprising:
means for generating an alarm signal in response to excessive deflection of the pin.

17. The invention of claim 15 further comprising:
means for automatically pulling the pin into the cavity and holding the pin in the cavity in response to deflection of the pin beyond a predetermined working zone.

* * * * *

UNITED STATES PATENT AND TRADEMARK OFFICE
CERTIFICATE OF CORRECTION

PATENT NO. : 4,547,772
DATED : Oct. 15, 1985
INVENTOR(S) : Ernst

It is certified that error appears in the above-identified patent and that said Letters Patent is hereby corrected as shown below:

IN THE DETAILED DESCRIPTION OF THE
PRESENTLY PREFERRED EMBODIMENTS

In column 2, line 62, please delete "release" and substitute "recess";

In column 3, line 29, please delete "way" and substitute "away";

In column 4, line 9, please delete "head";

In column 4, line 46, please insert "pivot" before the word "lever";

Signed and Sealed this

Twenty-fifth Day of August, 1987

Attest:

DONALD J. QUIGG

Attesting Officer     Commissioner of Patents and Trademarks